United States Patent
Nguyen et al.

(10) Patent No.: US 7,092,190 B2
(45) Date of Patent: Aug. 15, 2006

(54) DYNAMIC POWER SUPPLY

(75) Inventors: Don J. Nguyen, Portland, OR (US); Alan L. Marquardt, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 09/862,262

(22) Filed: May 21, 2001

(65) Prior Publication Data
US 2002/0171963 A1    Nov. 21, 2002

(51) Int. Cl.
*G11B 15/18* (2006.01)
(52) U.S. Cl. .................................................. 360/69
(58) Field of Classification Search .................. 360/69
See application file for complete search history.

(56) References Cited
U.S. PATENT DOCUMENTS

| | | | | |
|---|---|---|---|---|
| 5,204,593 A | * | 4/1993 | Ueki | .......................... 318/254 |
| 5,307,329 A | * | 4/1994 | Shibuya et al. | ........... 369/13.22 |
| 5,544,138 A | * | 8/1996 | Bajorek et al. | ........... 369/53.42 |
| 5,854,720 A | * | 12/1998 | Shrinkle et al. | ............... 360/69 |
| 5,889,466 A | * | 3/1999 | Ferguson | ..................... 340/602 |
| 6,747,832 B1 | * | 6/2004 | Kisaka et al. | ............. 360/73.03 |
| 6,766,394 B1 | * | 7/2004 | Shimura et al. | ............. 710/100 |

* cited by examiner

*Primary Examiner*—Wayne Young
*Assistant Examiner*—Mitchell Slavitt
(74) *Attorney, Agent, or Firm*—Justin B. Scout

(57) ABSTRACT

Briefly, descriptions of embodiments for, at least practically, reducing the power consumption of a mass storage device are provided. The present disclosure relates to at least partially reducing the power consumption of a mass storage device and, more particularly, to a method and device for at least partially reducing the power consumption of a mass storage device. One embodiment may include a power supply coupled with at least one mass storage device, and a control circuit. The control circuit may be capable of at least partially dynamically adjusting the amount of electrical power supplied to the mass storage device based, at least in part, upon at least one signal provided to the control circuit.

13 Claims, 6 Drawing Sheets

DYNAMIC POWER SUPPLY

BACKGROUND

1. Field

The present disclosure relates to at least partially reducing the power consumption of a mass storage device and, more particularly, to a method and device for at least partially reducing the power consumption of a mass storage device.

2. Background Information

In this context, a mass storage device may be characterized as any device used to provide relatively inexpensive storage, such as, for example, a couple hundred dollars, of relatively large amounts of data, such as, for example, a hundred megabytes or more, in either digital or analog form; however, the disclosed subject matter is not limited to any price or storage capacity. While a mass storage device may comprise may forms, some, but not all, examples of a mass storage device may include: flash memory, cassette storage, tape storage, optical storage, or a hard disk drive.

As a specific example of a mass storage device, a hard disk drive (also referred to as a "hard drive" or "hard disk") typically comprises a device that reads and writes digital data typical upon at least one rigid disk of magnetic or magnetically coated material, rotating in a sealed housing. In this context, the terms "digital data" and "digital format" refer to data represented in discrete, discontinuous form, as contrasted with analog data, which is represented in a continuous form. Digital data usually implies the use of binary digits; however, the term digital data is not limited to binary digits and may utilize any radix.

Typically, mass storage devices are used in information handling platforms. In this context, an information handling platform includes a system, which is capable of accepting and at least possibly manipulating information, possibly in a variety of formats and modes, and in part stores digital data using a mass storage device. A few, but not all, examples of an information handling platform include computers, digital video recorders, or digital audio devices which may receive audio information via, for example, removable media or possibly a network connection, and store the audio information on the mass storage device.

A mass storage device is often one of the components of an information storage platform that consumes a large amount of power, such as, for example, about 2 Watts (W); however, the disclosed subject matter is not limited to any particular wattage. As an example, an information handling platform, such as, for example, a notebook computer, may utilize a mass storage device, such as, for example, a hard disk drive. The power consumption of the notebook's hard disk drive will typically reduce the amount of time the notebook computer may operate from battery power. A need, therefore, exists for an improved device or technique for at least partially reducing the power consumption of a mass storage device.

BRIEF DESCRIPTION OF THE DRAWINGS

Subject matter is particularly pointed out and distinctly claimed in the concluding portions of the specification. The claimed subject matter, however, both as to organization and as to the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the claimed subject matter. However, it will be understood by those skilled in the art that the claimed subject matter may be practiced without these specific details. In other instances, well-known methods, procedures, components, and circuits have not been described in detail so as not to obscure the claimed subject matter.

At a high level, the components comprising a mass storage device may generally be categorized into two groups based upon their function and power consumption. The first group includes components that may be actively involved in the reading and writing of data to and from the mass storage device's storage medium. This group of data components is typically a high consumer of power in the device. The second group includes components that may control the interaction between the system that comprises the mass storage device and the first group of components. This general group typically consumes less power than the first group and may also be designed to tolerate operation at a lower current or voltage than the first group.

Figure 1:
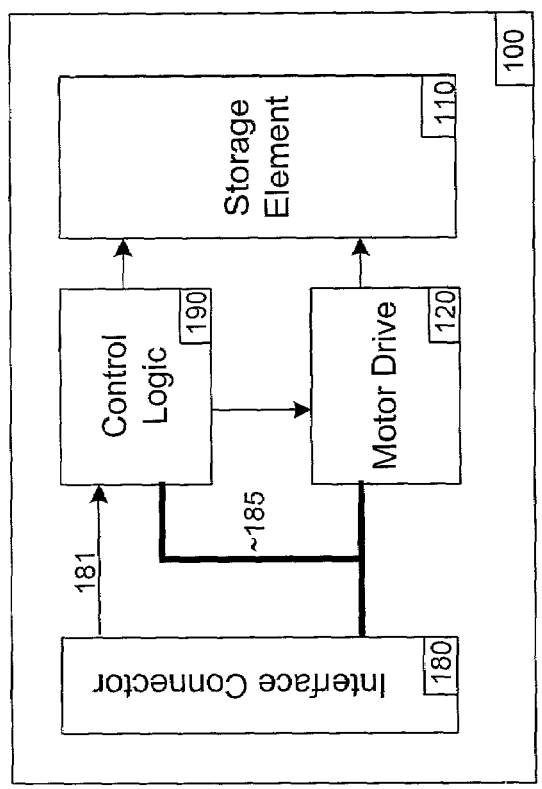
FIG. 1 is a block diagram illustrating an embodiment of a hard disk drive.

As an example, although other examples may be used, a hard drive may include the components illustrated in FIG. 1. Hard drive 100 may include storage element 110, motor drive 120, control logic 190, and interface connector 180; however, a hard drive may include other components than illustrated in this example. In this example, interface connector 180 routes control and data signals 181 along with power signal 185 between the host system, e.g. a computer (not shown), that comprises the hard drive, and the components of the hard drive. Control logic 190 may, in this example, control the interaction between the host system, motor drive 120, and storage element 110. Motor drive 120, typically, provides the spinning action for storage element 110. When a hard drive is operated as part of, as an example, a notebook computer, the power supply, $V_{cc}$, to the hard drive is typically 5V±5% or 12V±5%; however, this particular voltage level is merely a non-limiting example.

In this example, the power, $V_{cc}$, for motor drive 120 and control logic 190 may be shared and common with each other. However, control logic 190 may be sufficiently tolerant to operate at a lower voltage, such as, for example, 3.3 volts (V)±5%; whereas, motor drive 120 may not be sufficiently tolerant to operate at a voltage other than the shared $V_{cc}$, which as an example may be 5V±5% or 12V±5%; however, the claimed subject matter is not limited to any specific voltage level. One skilled in the art will recognize that other voltages may be used.

Figure 2:
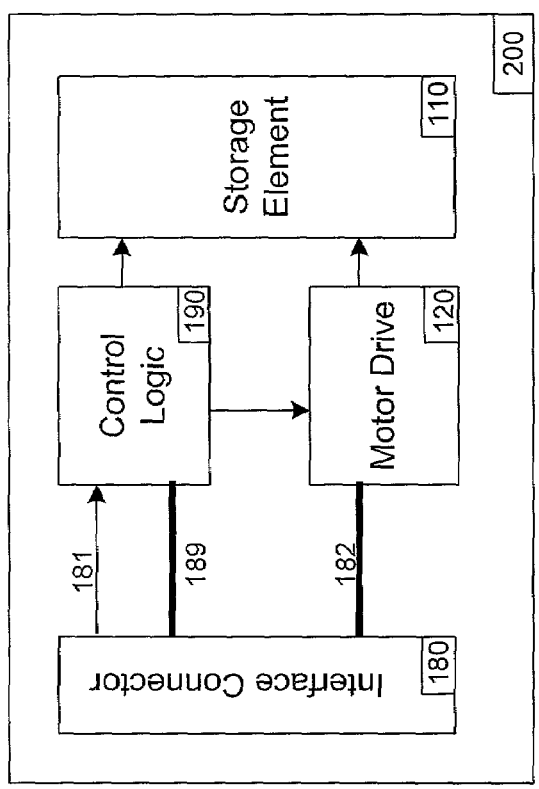
FIG. 2 is a block diagram illustrating an alternate embodiment of a hard disk drive.

One embodiment of a device that at least partially reduces the amount of power consumed by a mass storage device is illustrated in FIG. 2. Unlike the device illustrated in FIG. 1, in which power signal 185, and hence $V_{cc}$, may be shared and common between both drive motor 120 and control logic 190, power savings may be accomplished by applying separate power signals to specific components based at least in part upon the voltage or electrical tolerances of the components. For example, in FIG. 2, interface connector 180 may be coupled with the more voltage tolerant component, control logic 190, via low voltage power signal 189. Interface connector 180 may also be coupled with the less voltage tolerant component, motor drive 120, via high voltage signal 182. By limiting the power supplied to specific components, based at least in part upon the voltage or electrical tolerances of the components, the power consumption of the device as a whole may be at least partially reduced.

For example, in FIG. 1, power signal 185 may supply a voltage, such as, for example, about 5V to both control logic block 190 and motor drive 120. However, if control logic block 190 is able to tolerant voltages as low as, such as, for example, about 3.3V, a partial reduction in the power consumed by control logic block 190, such as, for example, on the order of approximately 33% may be achieved by coupling control logic block 190 with power supply 189, as in FIG. 2, which may supply a voltage, such as, for example, of about 3.3V.

A mass storage device may also have a number of operating modes. These operating modes may be generally categorized into groups representing either active or idle modes. While operating in one of the active modes of the mass storage device, the power consumption of the device is relatively high compared to the power consumption of the device while operating in an idle mode. When operating in an active mode, the mass storage device, typically, effectively powers both its control components and data components, which read and/or write to a storage medium. However, when operating in an idle mode, the typical mass storage device may effectively provide power primarily to the control components of the device. When operating in an idle mode, the power consumption of the data components may be either significantly reduced or effectively zero. The difference in power consumption between the active and idle modes may be explained, at least in part, by the reduction in the number of components that the mass storage device effectively filly powers. In addition, as described above, generally these control components may also be capable of tolerating operation at a lower current or voltage than the data components.

To continue the above hard drive example, a typical hard drive may operate in one of four power modes, although other mass storage devices or even other hard drives may include other power modes. In the first mode, "OFF," may include a condition where the hard drive may effectively consume zero power. In this mode, the power consumption of the hard drive, in this example, may essentially be zero.

The second mode, "SPIN UP," may include a condition where motor drive 120 might possibly cause storage element 110 to transition from a static to a spinning state. In this mode, the power consumption of the hard drive, in this example, may be substantially 2.6 watts (W) at about 5V and 525 milliamps (mA); however, the claimed subject matter is not limited to any specific level of power consumption.

The third mode, "SPINNING," may include a condition where motor drive 120 might possibly maintain the spinning state of storage element 110. In this mode, the power consumption of the hard drive, in this example, may be substantially 1.9 W at about 5V and 385 mA; however, the claimed subject matter is not limited to any specific level of power consumption.

The fourth state, "IDLE," may include a condition where motor drive 120 might possibly no longer cause storage element 110 to spin, by possibly, as an example, either halting storage element 110, or, as another example, allowing the spinning motion of the element to naturally degrade. In this mode, the power consumption of the hard drive, in this example, may be substantially 0.83 W at about 5V and 166 mA; however, the claimed subject matter is not limited to any specific level of power consumption. In the IDLE state, the amount of power consumed by components, such as, for example, motor drive 120 is significantly reduced. These operating modes may be grouped into the active category, comprising the "SPIN-UP" and "SPINNING" modes, and the idle category, comprising the "IDLE" and "OFF" modes.

One embodiment of a device that at least partially reduces the amount of power consumed by a mass storage device, may comprise a device or technique which dynamically partially adjusts the amount of power supplied to the mass storage device based at least in part upon the operating state or mode of the mass storage device. For example, such a device may include a power supply and control circuit. The control circuit may be coupled to the mass storage device in such a way as to sense or measure a signal that may give some indication of whether the mass storage device is operating in an active or idle mode. Because, as described above, a mass storage device typically consumes less power when operating in an idle mode than when it operates in an active mode, the control circuit may at least partially lower the amount of power supplied to the mass storage device when the control circuit determines that the mass storage device is operating in an idle mode.

The control components of the mass storage device are typically capable of tolerating operation at a lower current or voltage than the other components of the device. In addition, these control components are often the primary consumers of power when the mass storage device is operating in an idle mode. Therefore, a control circuit of a power reduction device may, at least in part, lower the power supplied to the mass storage device by reducing the voltage or the current supplied to the mass storage device when it is operating in an idle mode.

Figure 3:
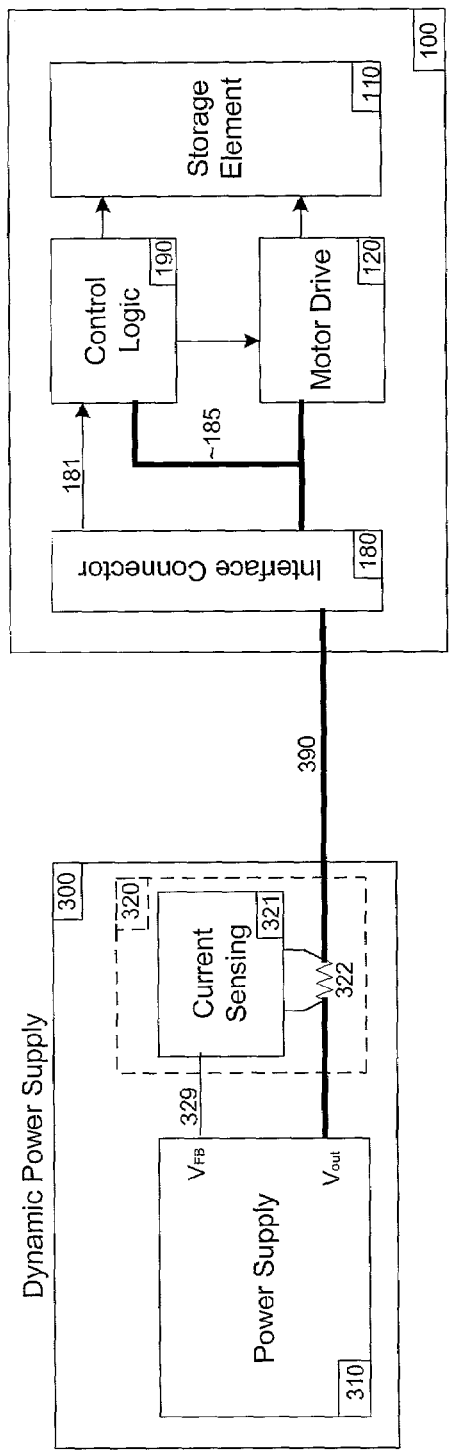
FIG. 3 is a block diagram illustrating an embodiment of a dynamic power supply.

An embodiment of a device that at least partially reduces the amount of power consumed by a mass storage device, although the claimed subject matter is not limited to any specific embodiment, is illustrated as dynamic power supply 300 in FIG. 3. Hard drive 100 may be coupled with dynamic power supply 300 via power signal 390. Power signal 390 may be further coupled to power supply 310, which may include a standard power supply and supply the electrical voltage and current of power signal 390.

Control circuit 320, for example, may measure the current of power signal 390; however, other electrical properties of power signal 390 may alternatively be utilized in other embodiments. This may be achieved, as one example, by measuring the current drain passed through current-sense resistor 321, which may be placed in series with power signal 390. Control circuit 320 may, based at least partially on this measurement, then supply a feedback voltage, $V_{FB}$, to power supply 310 via signal 329. This feedback voltage, for example, may comprise the output voltage, $V_{out}$, desired from power supply 310, or, a voltage, such as, for example, the difference between the presently measured output voltage and the desired output voltage. However, one skilled in the art will recognize that other signals may be utilized to provide feedback to power supply 310.

Different operating modes of hard drive 100 may have a substantially unique amount of current drain associated with it. Some examples of these modes and their possible current drains are described above; however, the embodiment is not limited to any specific modes or current drains. By measuring the current drain, such as, for example, via power signal 390, control circuit 320 may effectively determine in which mode, active or idle, hard drive 100 is operating.

A typical drive may utilize different components depending at least in part upon which mode the drive is operating. Therefore, the power, current, and/or voltage characteristics of the components, utilized during different operating mode, may determine a lower feasible power consumption level for particular operating modes. Usually the majority of components that typically receive power, when the hard drive is in an idle mode, can often operate at a relatively low voltage. Conversely, usually the majority of components that typically receive power, when the hard drive is in an active mode, often operate at a relatively high voltage.

As a result, dynamic power supply 300 may effectively supply a low voltage when drive 100 operates in an idle mode. Conversely, dynamic power supply 300 may effectively supply a relatively high voltage while drive 100 operates in an active mode. The amount of power consumed by drive 100 may be reduced, at least in part, because of the relatively low voltage supplied while the device is operated in an idle mode.

For example, as described above, a typical hard drive consumes approximately 0.83 W of power while in IDLE mode because the typical drive may consume about 166 mA of current at a voltage drive of about 5V. Conversely, utilizing the embodiment illustrated by FIG. 3, control circuit 320 may at least partially reduce the voltage supplied by power signal 390 to approximately, as an example, 3.3V. This might reduce the power consumption of the drive, when operated in IDLE mode, to 0.25 W. However, the claimed subject matter is not limited to any particular power, voltage, or current consumption.

Figure 4:
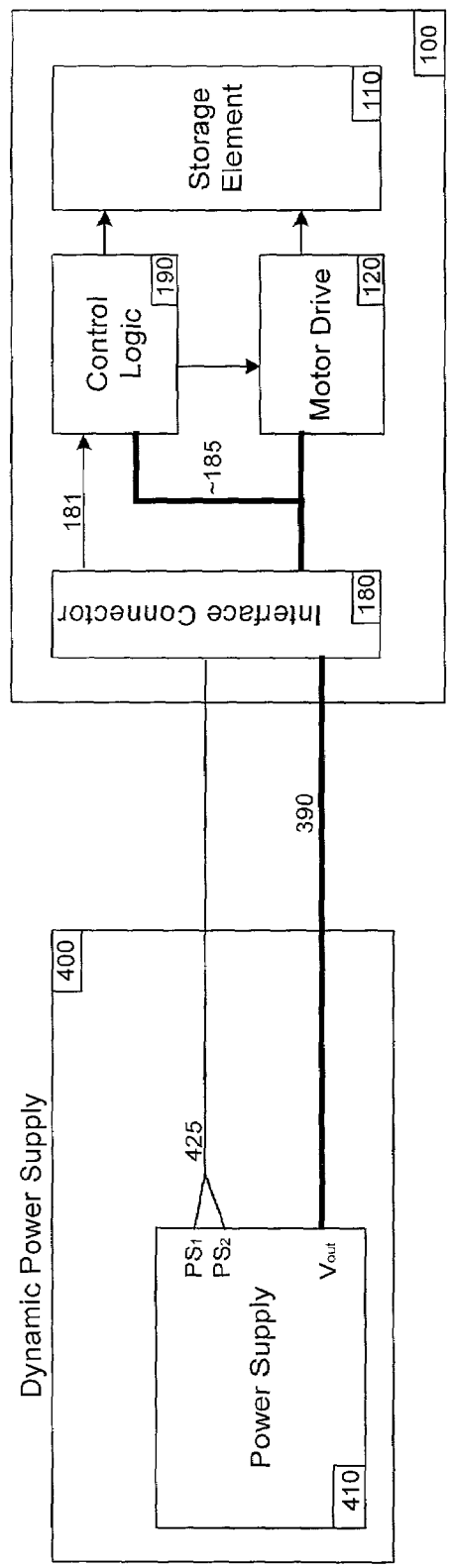
FIG. 4 is a block diagram illustrating an alternate embodiment of a dynamic power supply.

Another embodiment of a device that at least partially reduces the amount of power consumed by a mass storage device, although the claimed subject matter is not limited to any specific embodiment, is illustrated as dynamic power supply 400 in FIG. 4. Hard drive 100 may be coupled with dynamic power supply 400 via power signal 390. Control circuit 320 may be integrated as part of power supply 410. As opposed to measuring power signal 390, dynamic power supply 400 may measure control signal 425, which may give some indication of the operating mode of drive 100.

Control signal 425 may include a number of signals. Control signal 425 may also include a digital value representing the current operating mode of drive 100. However, an analog value may also be utilized to represent, either directly or indirectly, the present operating mode of drive 100. Control signal 425 may originate from any of a variety of components, such as, for example, drive 100, as illustrated in FIG. 4, a third device (not shown) which is external to both drive 100 and dynamic power supply 400, any component of dynamic power supply 400, or, possibly, a combination of any of these devices, just to provide a few examples.

The control circuit of dynamic power supply 400 may measure the value of control signal 425. Based, at least in part, upon the value of control signal 425, the control circuit of dynamic power supply 400 may dynamically adjust the voltage level supplied via power signal 390, as described above.

Figure 5:
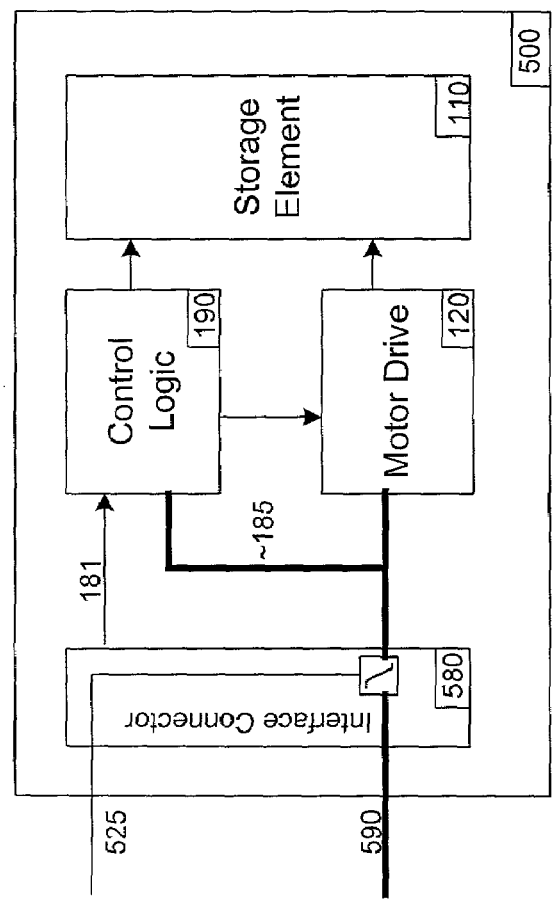
FIG. 5 is a block diagram illustrating an alternate embodiment of a dynamic power supply and hard disk drive.

Another embodiment of a device that at least partially reduces the amount of power consumed by a mass storage device is illustrated in FIG. 5. In this embodiment, interface connector 580 may receive some indication of the current operating mode of the device. Because a typical drive may utilize different components depending at least partially upon which mode the drive is operating, interface connector 580 may effectively supply a low voltage when drive 500 operates in an idle mode. Conversely, interface connector 580 may effectively supply a relatively high voltage while drive 500 operates in an active mode.

Figure 6:
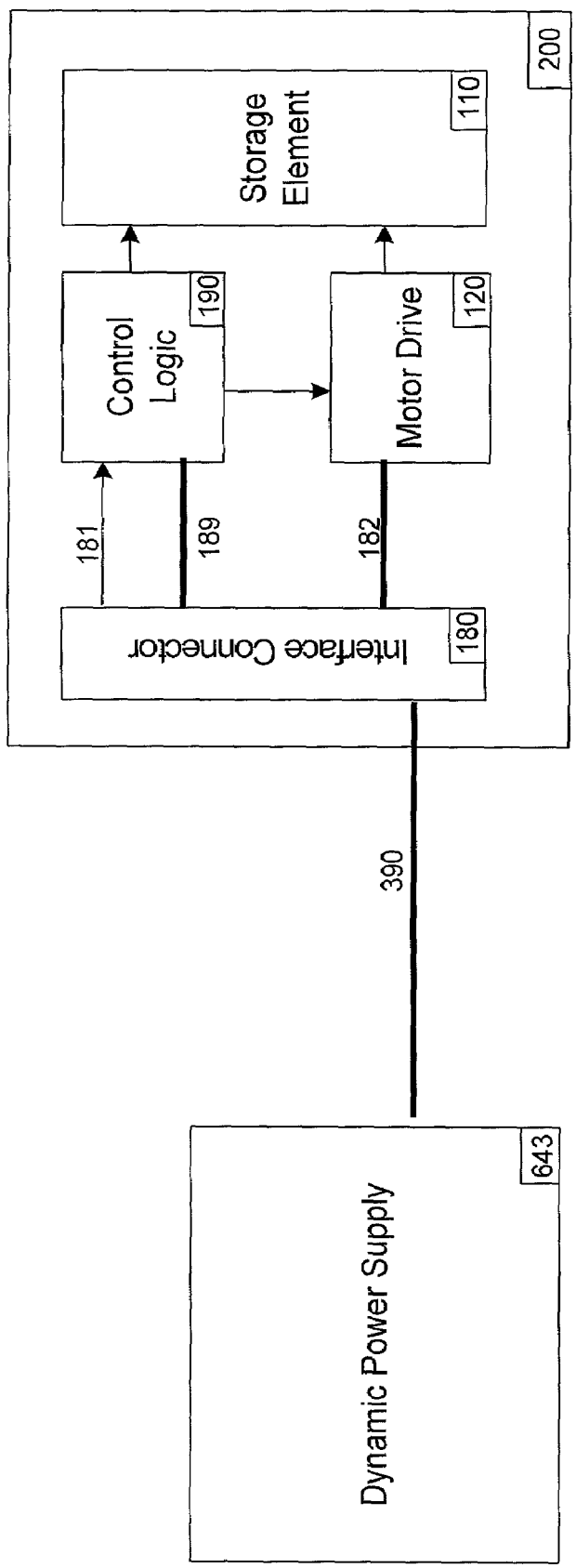
FIG. 6 is a block diagram illustrating an alternate embodiment of a hard disk drive.

Another embodiment of a device or system that at least partially reduces the amount of power consumed by a mass storage device, although the claimed subject matter is not limited to any specific embodiment, is illustrated, in FIG. 6. System 600 may include a dynamic power supply, such as, for example, those illustrated in FIG. 3 or 4, and a mass storage device, such as, for example, the hard drive illustrated in FIG. 2. Hard drive 200 may be coupled with dynamic power supply 643 via power signal 390. Power signal 390 may be adjusted via a variety of schemes, some of which may include those described in the previous embodiments. Power signal 390 may, at least, be coupled with interface connector 180. Interface connector may provide both low power signal 189 and high power signal 182 to at least some of the components of drive 200. By providing separate power signals to at least some of the components of drive 200, there may be an at least partial reduction in electrical transients that may be result from, among other possible sources, changes in the amount of electrical power supplied by dynamic power supply 643.

An additional embodiment of the claimed subject matter, although the claimed subject matter is not limited to any specific embodiment, may include an information handling platform coupled with a power supply, a control circuit and a mass storage device, as shown, for example, in FIG. 3, 4 or 5. In this particular embodiment, the power supply, control circuit and mass storage device may be coupled so as to, during operation, dynamically reduce the amount of power consumed by the mass storage device.

An additional embodiment of the claimed subject matter, although the claimed subject matter is not limited to any specific embodiment, may include an information handling platform coupled with a dynamic power supply, such as, for example, as illustrated in FIG. 4, and a mass storage device. The information handling system or platform may include software which may inform the dynamic power supply which operating mode the mass storage device is presently in or about to enter. The dynamic power supply may then adjust, as described above, the amount of power supplied to the mass storage device. Further embodiments may include a more typical power supply and a mass storage device, such as, for example, illustrated in FIG. 5. In this embodiment, the software may inform the mass storage device of the present or imminent operating mode of the device. Of course, there may also be other embodiments such as, for example, an embodiment that combines the previous two embodiments.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

What is claimed is:

1. An apparatus comprising:
  a power supply coupled with an interface connector of at least one mass storage device and
  a control circuit;

said control circuit capable of, during operation, at least partially dynamically adjusting the amount of electrical power supplied to said mass storage device based, at least in part, upon at least one signal provided to said control circuit;

wherein said control circuit is capable of, during operation, determining the operating state of said mass storage device based at least in part upon said at least one signal; and wherein said at least one signal comprises a measurement of the amount of electrical power supplied by said power supply.

2. The apparatus of claim 1, wherein said mass storage device comprises a hard disk drive.

3. The apparatus of claim 1, wherein said control circuit capable of at least partially dynamically adjusting the amount of electrical power supplied to said mass storage device is further capable of dynamically adjusting the voltage supplied to said mass storage device.

4. An apparatus comprising:
a power supply coupled with an interface connector of at least one mass storage device and
a control circuit;
said control circuit capable of, during operation, at least partially dynamically adjusting the amount of electrical power Supplied to said mass storage device based, at least in part, upon at least one signal provided to said control circuit;
wherein said apparatus is capable of, during operation, reducing the amount of electrical power supplied to said mass storage device at least in response to said mass storage device transitioning from an active state to an idle state; and
wherein said apparatus is adapted to supply electrical power having a voltage between a range of 2V to 4V, exclusive, when said mass storage device is operating in an idle state.

5. An apparatus comprising:
a power supply coupled with an interface connector of at least one mass storage device and
a control circuit;
said control circuit capable of, during operation, at least partially dynamically adjusting the amount of electrical power supplied to said mass storage device based, at least in part, upon at least one signal provided to said control circuit;
wherein said apparatus is capable of, during operation, reducing the amount of electrical power supplied to said mass storage device at least in response to said mass storage device transitioning from an active state to an idle state; and
wherein said apparatus is adapted to increase the amount of electrical power supplied to said mass storage device at least in response to said mass storage device transitioning from an idle state to an active state.

6. The apparatus of claim 5 wherein said apparatus is adapted to supply electrical power, when said mass storage device is operating in an active state, having a voltage in one of the voltage ranges selected from a group consisting essentially of 4V to 6V, inclusive, and 10V to 14V, inclusive.

7. An apparatus comprising:
a power supply coupled with an interface connector of at least one mass storage device and
a control circuit;
said control circuit capable of, during operation, at least partially dynamically adjusting the amount of electrical power supplied to said mass storage device based, at least in part, upon at least one signal provided to said control circuit;
wherein said control circuit is capable of, during operation, determining the operating state of said mass storage device based at least in part upon said at least one signal; and
wherein said signal comprises a measurement related to the operating power of said mass storage device.

8. The apparatus of claim 7, wherein said measurement comprises a measurement of current.

9. A mass storage device comprising:
a first set of components, and
a second set of components which are capable of operating at a lower voltage than said first set of components;
a control circuit;
said control circuit capable of, during operation, at least partially dynamically adjusting the amount of electrical power supplied to said first set of components based, at least in part, upon the operating state of said mass storage device.

10. The mass storage device of claim 9, wherein said control circuit is adapted to determine the operating state of said mass storage device based at least in part upon at least one signal.

11. The mass storage device of claim 9, wherein said mass storage device is adapted to reduce the amount of electrical power supplied to said first set of components at least in response to said mass storage device transitioning from an active state to an idle state.

12. The mass storage device of claim 11, wherein said mass storage device is adapted to increase the amount of electrical power supplied to said first set of components at least in response to said mass storage device transitioning from an idle state to an active state.

13. The mass storage device of claim 12, wherein said mass storage device is adapted to substantially maintain the voltage supplied to said second set of components substantially regardless of the operating state of said mass storage device.

* * * * *

UNITED STATES PATENT AND TRADEMARK OFFICE
CERTIFICATE OF CORRECTION

PATENT NO.       : 7,092,190 B2
APPLICATION NO.  : 09/862262
DATED            : August 15, 2006
INVENTOR(S)      : Nguyen et al.

It is certified that error appears in the above-identified patent and that said Letters Patent is hereby corrected as shown below:

In column 3, at line 41, delete "filly" and insert --fully--.

Signed and Sealed this

Twenty-seventh Day of November, 2007

JON W. DUDAS
*Director of the United States Patent and Trademark Office*